Feb. 2, 1943.  B. F. KLAWITTER  2,309,850
TRAILER HITCH
Filed Dec. 1, 1941    2 Sheets-Sheet 1
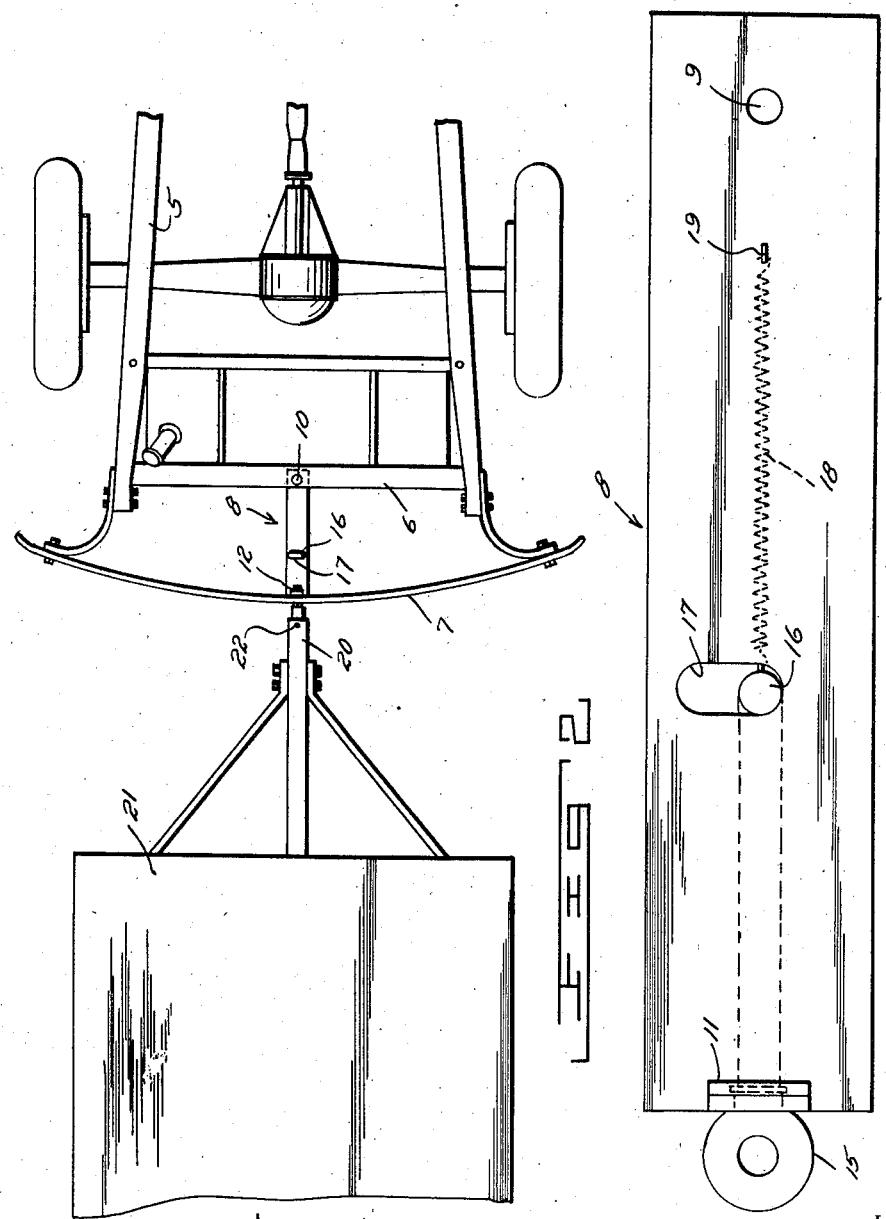
Inventor
Branch F. Klawitter
By Clarence A. O'Brien
Attorney

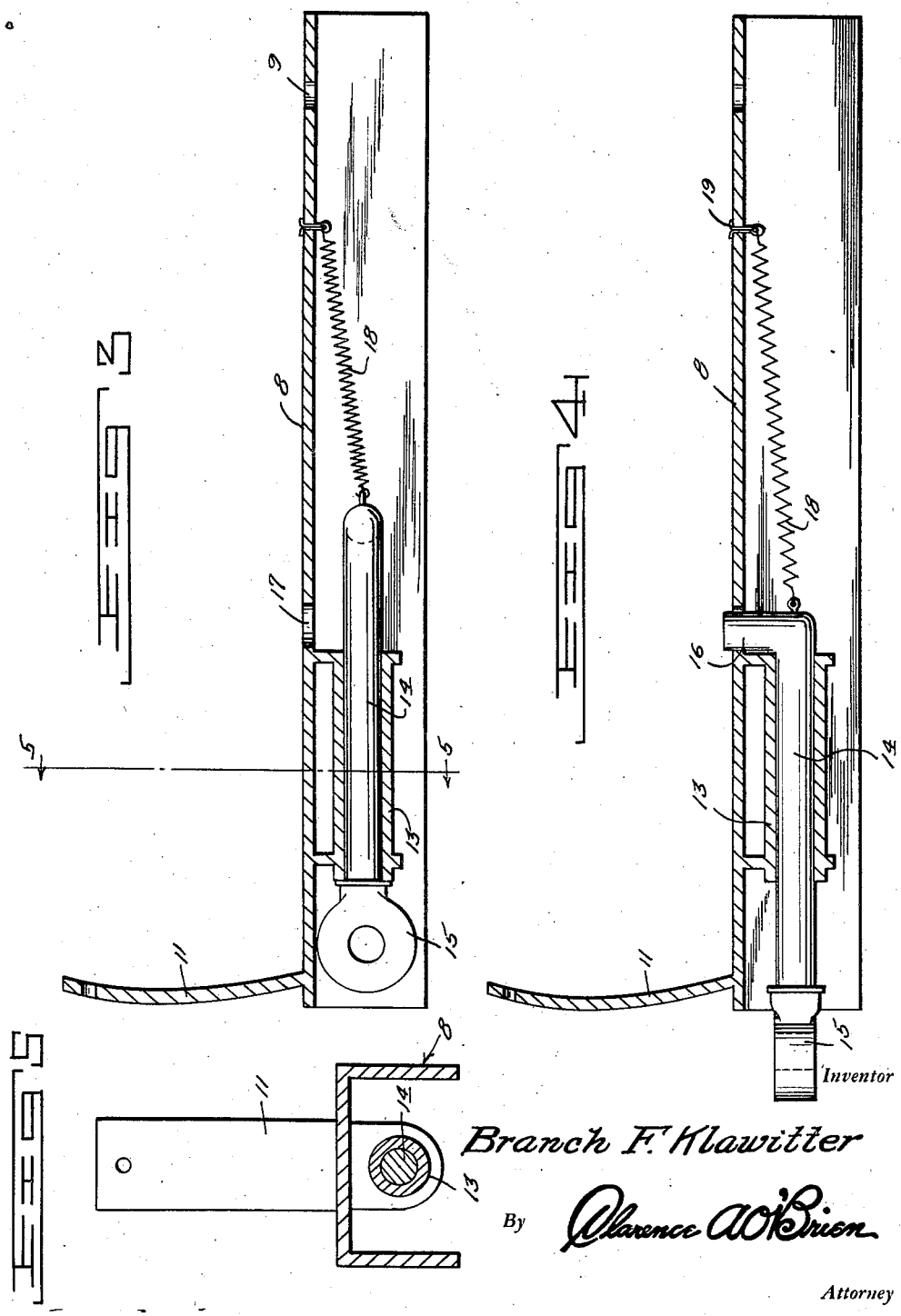

Patented Feb. 2, 1943

2,309,850

UNITED STATES PATENT OFFICE 2,309,850

TRAILER HITCH

Branch F. Klawitter, Fairfax, Minn.

Application December 1, 1941, Serial No. 421,201

3 Claims. (Cl. 280—33)

The present invention relates to new and useful improvements in trailer hitches of a type adapted to attach a trailer to the rear of an automobile and has for its primary object to provide a device of this character having its outer end attachable to the rear bumper of the vehicle and embodying a spring-retracted eye bolt for receiving the coupling pin and in which the eye bolt is movable into a retracted position inwardly of the rear bumper when the trailer hitch is not in use.

A further object is to provide a device of this character of simple and practical construction, which is strong and durable, relatively inexpensive to manufacture and install in operative position on the machine and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a fragmentary top plan view of an automobile showing the trailer hitch attached thereto for connecting a trailer to the automobile.

Figure 2 is a top plan view of the trailer hitch.

Figure 3 is a longitudinal sectional view thereof.

Figure 4 is a similar view showing the eye bolt in projected position, and

Figure 5 is a vertical sectional view taken substantially on a line 5—5 of Figure 3.

Referring now to the drawings in detail, wherein for the purpose of illustration I have disclosed a preferred embodiment of the invention, the numeral 5 designates the chassis of an automobile having a rear transverse frame member 6 and a rear bumper 7 attached thereto in a conventional manner.

The trailer hitch is designated generally at 8 and includes a channel iron member having an opening 9 at one end adapted for attaching to the frame member 6 by a bolt or rivet 10.

The channel iron member is secured in an inverted position and adjacent the outer end thereof is formed an upstanding arcuate lug 11 adapted for conformably fitting against the inner surface of the bumper 7 and secured thereto by means of a bolt 12.

To the underside of the channel member is formed a tubular guide 13 having the shank portion of an eye bolt 15 slidably mounted therein, the inner end of the bolt having an angular extension 16 adapted for movement into and out of position in a transversely extending slot 17 in the top of the channel member.

To the inner end of the bolt 14 is attached one end of a coil spring 18, while the other end of the spring is secured to the channel member adjacent its inner end by a pin 19.

In the operation of the device the spring 18 normally serves to retract the bolt 14 into the position as shown in Figure 3 when the angular extension 16 is withdrawn from the opening 17.

When it is desired to attach the drawbar 20 of a trailer 21 to the vehicle, the eye bolt 15 is pulled rearwardly and turned with the eye horizontally so that the angular extension 16 will project upwardly through the opening 7 and the bolt is then retained in its projected position with the eye 15 projecting outwardly from the rear end of the channel member and adapted to receive the coupling pin 22 of the drawbar for connecting the trailer thereto.

It is believed the details of construction and manner of use of the device will be readily understood from the foregoing without further detailed explanation.

Having thus described the invention what I claim is:

1. A trailer hitch comprising an elongated member having one end attached to a vehicle frame, a vertical lug on the member adapted for positioning against a vehicle bumper and secured thereto, and a spring-retracted coupling member carried by the first-named member and movable into a position forwardly of the bumper when not in use.

2. A trailer hitch comprising an elongated member having one end attached to a vehicle frame, a vertical lug on the member adapted for positioning against a vehicle bumper and secured thereto, said member having an opening therein, and a spring-retracted coupling member carried by the first-named member and having a part insertible in said opening to retain the coupling member in a rearwardly projected position.

3. A trailer hitch comprising an elongated member having one end attached to a vehicle frame, a vertical lug on the member adapted for positioning against a vehicle bumper and secured thereto, said member having an opening therein, a spring-retracted coupling member rotatably carried by the first-named member and having an eye at its rear end, and a lateral extension on the front end of the coupling member and movable into a position in said opening upon rotation of the coupling member to retain the latter in a rearwardly projected position.

BRANCH F. KLAWITTER.